US010006260B2

(12) United States Patent
Webre et al.

(10) Patent No.: US 10,006,260 B2
(45) Date of Patent: Jun. 26, 2018

(54) POWER TONG SPOOL VALVE SPEED LIMITING SYSTEM

(71) Applicant: Frank's International, Inc., Houston, TX (US)

(72) Inventors: Charles M. Webre, Lafayette, LA (US); Jarred M. Thibodeaux, Lafayette, LA (US); Dax J. Neuville, New Iberia, LA (US)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 356 days.

(21) Appl. No.: 14/610,538

(22) Filed: Jan. 30, 2015

(65) Prior Publication Data

US 2015/0275598 A1 Oct. 1, 2015

Related U.S. Application Data

(60) Provisional application No. 61/973,109, filed on Mar. 31, 2014.

(51) Int. Cl.
*E21B 19/16* (2006.01)
*B25B 13/54* (2006.01)
*B25B 23/14* (2006.01)
*F16L 15/00* (2006.01)
*G01L 5/24* (2006.01)

(52) U.S. Cl.
CPC ............ *E21B 19/164* (2013.01); *B25B 13/54* (2013.01); *B25B 23/14* (2013.01); *E21B 19/16* (2013.01); *E21B 19/161* (2013.01); *F16L 15/00* (2013.01); *G01L 5/24* (2013.01)

(58) Field of Classification Search
CPC ...... E21B 19/161; E21B 19/16; E21B 19/164; B25B 13/54; B25B 23/14; F16L 15/00; G01L 5/24
USPC .................. 81/57.34, 57.11, 57.16; 285/390
See application file for complete search history.

(56) References Cited

U.S. PATENT DOCUMENTS

| 4,099,429 | A | * | 7/1978 | Hauk | E21B 19/168 166/78.1 |
| 4,297,922 | A | * | 11/1981 | Higdon | E21B 19/164 81/57.18 |
| 5,161,438 | A | * | 11/1992 | Pietras | E21B 19/164 81/57.16 |
| 7,281,451 | B2 | * | 10/2007 | Schulze Beckinghausen | E21B 19/164 81/57.16 |

(Continued)

FOREIGN PATENT DOCUMENTS

CA 2664978 A1 9/2004

*Primary Examiner* — Monica Carter
*Assistant Examiner* — Katina Henson
(74) *Attorney, Agent, or Firm* — Chamberlain Hrdlicka

(57) ABSTRACT

A power tong assembly includes a power tong and a speed limiting system operably coupled to the power tong. The power tong is configured to grip and rotate a tubular segment in a first direction to make-up a threaded connection with the tubular segment and in a second direction to break-out the threaded connection with the tubular segment. The speed limiting system is configured to selectively allow the power tong to rotate the tubular segment in one of the first direction and the second direction at a maximum speed while limiting the power tong to rotate the tubular segment in the other of the first direction and the second direction below the maximum speed.

17 Claims, 11 Drawing Sheets

(56) References Cited

U.S. PATENT DOCUMENTS

| | | | | |
|---|---|---|---|---|
| 2008/0307930 A1* | 12/2008 | Veverica | .............. | E21B 19/164 81/57.34 |
| 2013/0255446 A1* | 10/2013 | Taggart | ................ | E21B 19/161 81/57.11 |

* cited by examiner

US 10,006,260 B2

POWER TONG SPOOL VALVE SPEED LIMITING SYSTEM

BACKGROUND

In oilfield exploration and production operations, various oilfield tubular members are used to perform important tasks, including, but not limited to, drilling the wellbore and casing a drilled wellbore. For example, a long assembly of drill pipes, known in the industry as a drill string, may be used to rotate a drill bit at a distal end to create the wellbore. Furthermore, after a wellbore has been created, a casing string may be disposed downhole into the wellbore and cemented in place to stabilize, reinforce, or isolate (among other functions) portions of the wellbore. As such, strings of drill pipe and casing may be connected together, such as end-to-end by threaded connections, in which a male "pin" end of a first tubular member is used to threadably engage a corresponding female "box" end of a second tubular member. Alternatively, a tubular string may be made-up of a series of male-male ended tubular joints coupled together by female-female couplers. The process by which the threaded connections are assembled is called "making-up" a threaded connection, and the process by which the connections are disassembled is referred to "breaking-out" the threaded connection. As would be understood by one having ordinary skill, individual pieces (or "joints") of oilfield tubular members may come in a variety of weights, diameters, configurations, and lengths.

Power tongs are machines that may be used to make-up and break-out threaded connections between adjacent tubular segments by gripping and rotating a first tubular segment relative to a second tubular segment to either make-up or break-out the threaded connection between the two tubular segments. FIG. 1 is a perspective view of an example of an externally gripping power tong 100. The power tong 100 includes a drive motor 110 that is hydraulically-powered and a gripping assembly mechanically coupled to the motor 110 for gripping and rotating a tubular segment received within a bay 106. A generally "C"-shaped gear housing 112 supports a pair of pivoting doors 114. The doors 114 may be closed to secure the bay 106 or swung open (as indicated in FIG. 1) to provide access to the bay 106. The bay 106 is generally surrounded by the gear housing 112. The center of the bay 106 is between a pair of generally opposed pivotable gripping jaws 120, each having a generally arcuate gripping surface disposed radially inwardly toward the center of the bay 119.

Makeup requirements for tubular connections require high torque, such as in the order of thousands, and up to tens of thousands, of ft-lb torque. The components of a power tong must be capable of producing and sustaining the torques required to rotate tubular segments. As such, safely and effectively handling tubular members within an oilfield environment remains a priority to increase the efficiency and effectiveness of such tubular handling equipment.

BRIEF DESCRIPTION OF THE DRAWINGS

For a detailed description of the preferred embodiments of the invention, reference will now be made to the accompanying drawings in which.

DETAILED DESCRIPTION

Figure 1:
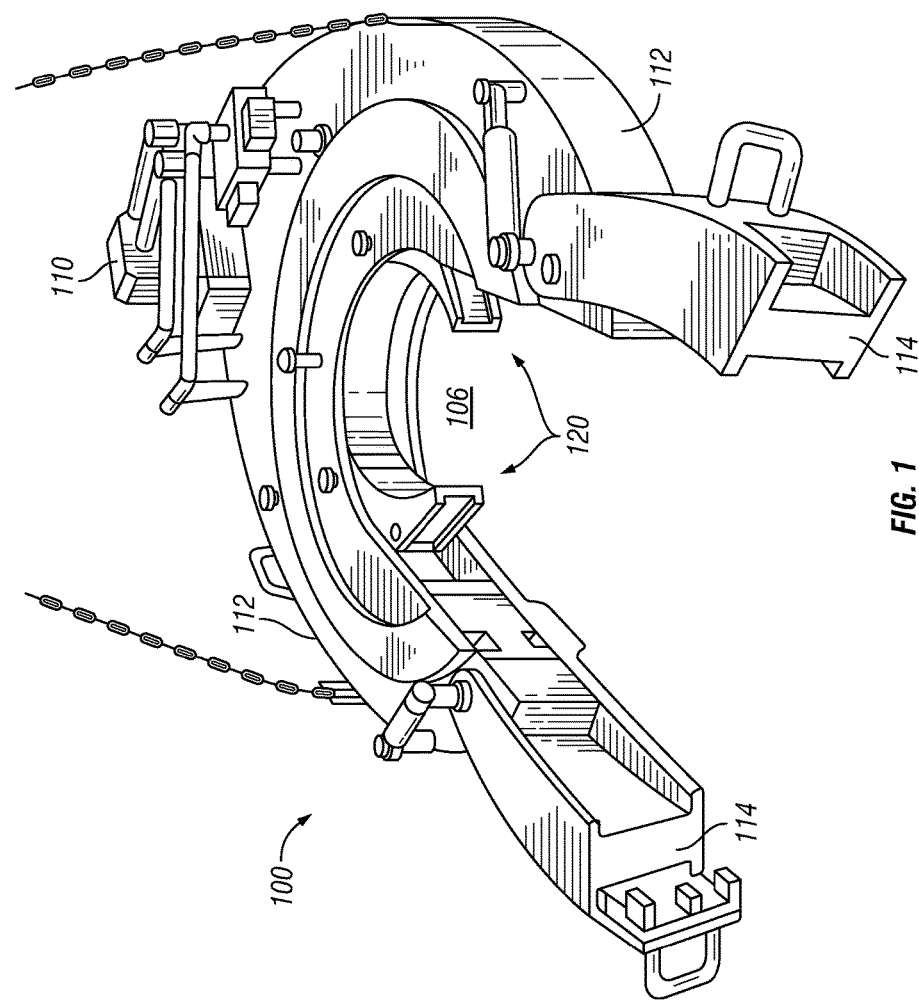
FIG. 1 shows a perspective view of an externally gripping power tong.

The following discussion is directed to various embodiments of the invention. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not structure or function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct coupling, and the "connect" or "connects" is intended to mean either an indirect or direct connection, unless otherwise denoted. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

In accordance with various aspects disclosed herein, the present disclosure relates to a power tong assembly that may be used to make-up and/or break-out connections between tubular members, such as within an oilfield exploration and production operation environment discussed above. The power tong assembly includes a power tong is configured to grip and rotate a tubular segment in a first direction, such as to make-up a threaded connection with the tubular segment, and in a second direction, such as to break-out the threaded connection with the tubular segment. The power tong may also include a high-speed setting to rotate the tubular segment in the first direction and/or the second direction in a high gear and a low-speed setting to rotate the tubular segment in the first direction and/or the second direction in a low gear.

Accordingly, the power tong assembly further includes a speed limiting system operably coupled to the power tong, in which the speed limiting system is configured to selectively allow the power tong to rotate the tubular segment in one of the first direction and the second direction while regulating, throttling, or otherwise limiting the speed for the power tong to rotate the tubular segment in the other of the first direction and the second direction. In one or more embodiments, the speed limiting system may enable the power tong to operate and rotate the tubular segment in one direction, such as the first direction, in high gear and low gear at an unregulated speed. Further, the speed limiting system may enable the power tong to operate and rotate the tubular segment in another direction, such as the second direction, but the speed limiting system may then only enable the power tong to operate and rotate the tubular segment in the other direction in high gear and low gear at a regulated speed.

For example, the power tong may be operated in a make-up direction (e.g., operated in a make-up setting) and may be operated in a break-out direction (e.g., operated in a break-out setting), in which the make-up direction enables the power tong to rotate a tubular segment in the first direction to make-up a threaded connection, and the break-out direction enables the power tong to rotate the tubular segment in the second direction to break-out the threaded connection. The speed limiting system may include a make-up setting that allows the power tong to rotate the tubular segment in the make-up direction in high gear and in low gear, while limiting or throttling the speed at which the power tong may rotate the tubular segment in the break-out direction in high gear and in low gear. In particular, when the speed limiting system is in the make-up setting, the speed limiting system may limit or throttle the speed for the power tong to rotate the tubular segment in the break-out direction in high gear and in low gear such that the power tong rotates the tubular segment in the break-out direction at a restricted speed, in high gear, similar to the operation and speed the power tong rotates the tubular segment when in low gear, and in low gear, slower than the speed the power tong rotates the tubular segment when in low gear and unrestricted (e.g., a slow creep).

Further, the speed limiting system may include a break-out setting that allows the power tong to rotate the tubular segment in the break-out direction in high gear and in low gear, while limiting or throttling the speed at which the power tong may rotate the tubular segment in the make-up direction in high gear and in low gear. In particular, when the speed limiting system is in the break-out setting, the speed limiting system may limit or throttle the speed for the power tong to rotate the tubular segment in the make-up direction in high gear and in low gear such that the power tong rotates the tubular segment in the make-up direction at a restricted speed, in high gear, similar to the operation and speed the power tong rotates the tubular segment when in low gear, and in low gear, slower than the speed the power tong rotates the tubular segment when in low gear and unrestricted. As such, the speed limiting system is configured to limit or restrict the speed at which the power tong may operate in the make-up setting when the speed limiting system is in the break-out setting, and further is configured to limit or restrict the speed at which the power tong may operate in the break-out setting when the speed limiting system is in the make-up setting.

The speed limiting system may further include a selector mechanism, such as operably coupled to a restrictor member of the speed limiting system, which enables the speed limiting system to move between or be functionally activated in either the make-up direction or the break-out direction. Furthermore, the speed limiting system may be coupled to a spool of a spool valve controlling flow to a hydraulic motor of the power tong assembly.

Figure 2A:
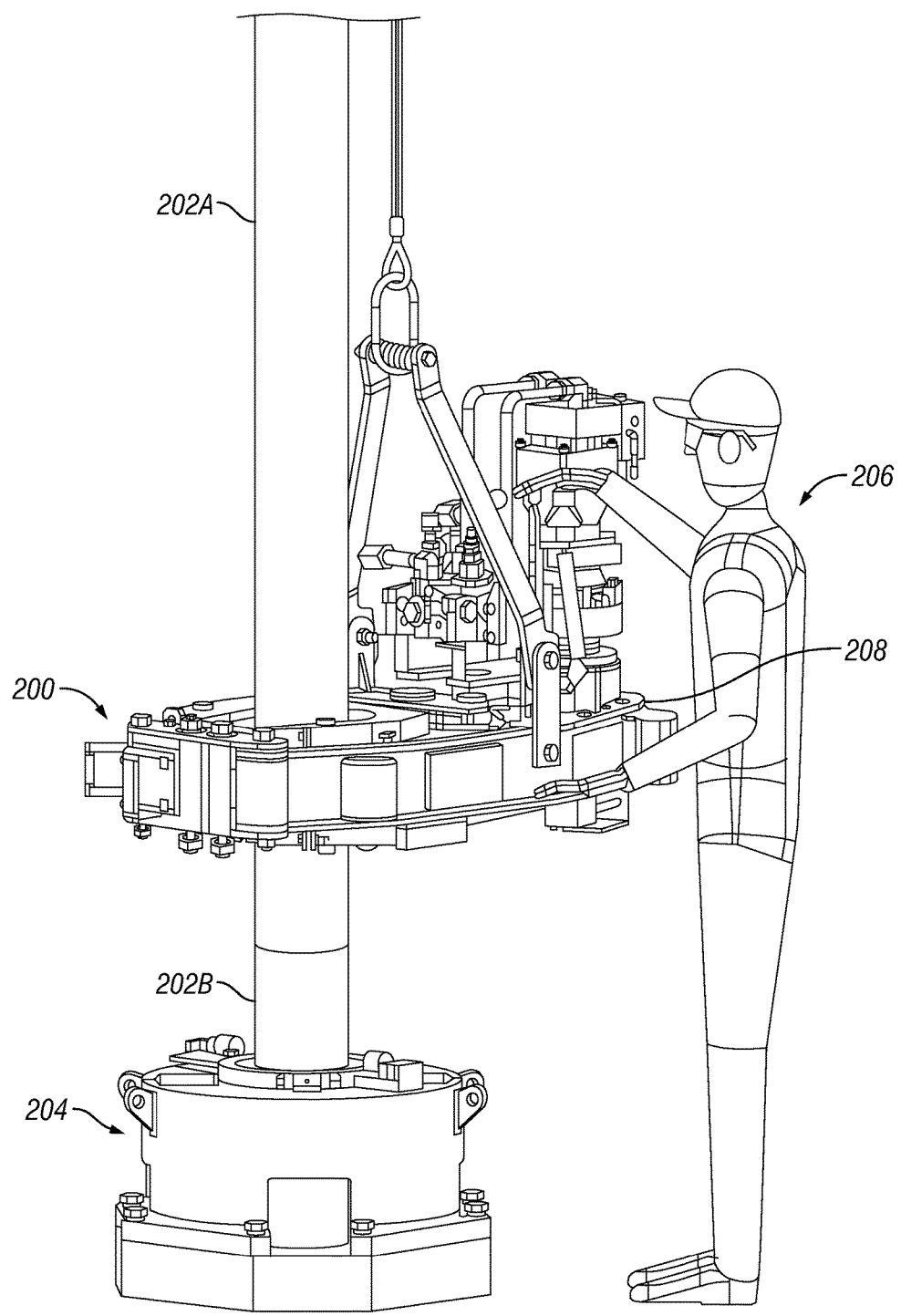
FIGS. 2A-2C show multiple views of a power tong assembly used to grip and rotate a tubular segment in accordance with one or more embodiments of the present disclosure.
Figure 2C:
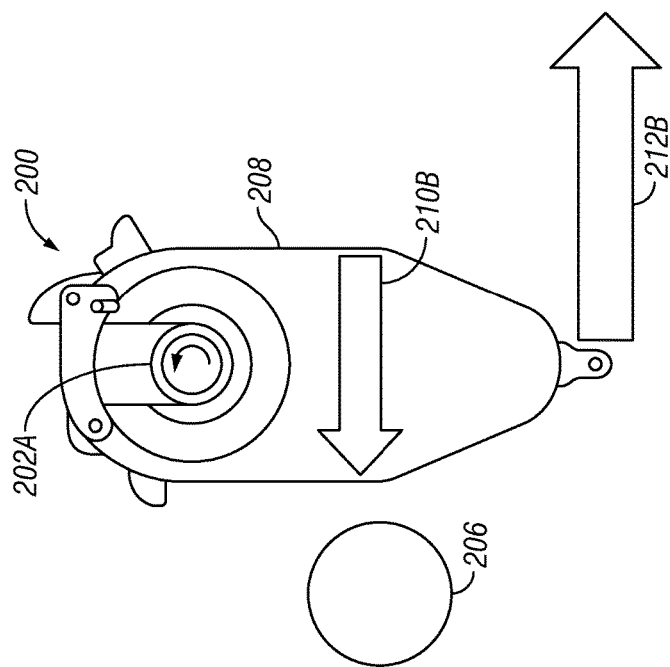
Figure 2B:
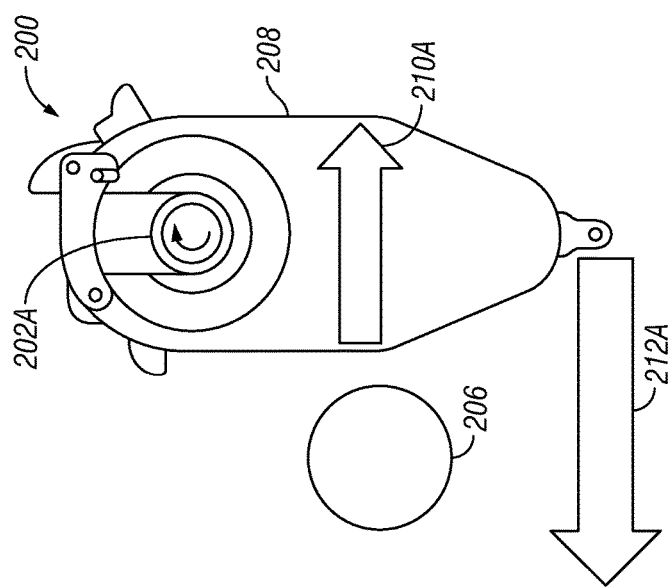

Referring now to FIGS. 2A, 2B, and 2C, multiple views of a power tong assembly 200 used to grip and rotate a tubular segment 202 in accordance with one or more embodiments of the present disclosure are shown. In particular, FIG. 2A shows a perspective view of the power tong assembly 200 when in use to make-up and/or break-out a threaded connection between a first upper tubular segment 202A and a second lower tubular segment 202B, FIG. 2B shows an above schematic view of the power tong assembly 200 when in use to make-up a threaded connection with the tubular segment 202, and FIG. 2C shows another above schematic view of the power tong assembly 200 when in use to break-out a threaded connection with the tubular segment 202.

In one or more embodiments, when making-up and breaking-out threaded connections between tubular segments, a mechanism or component is used to hold reaction torque on one tubular segment while the power tong is used to rotate the other tubular segment. One or more power tong assemblies may include with integral backup wrenches, in which the backup wrench may hold reaction torque on a tubular segment while the power tong makes-up and breaks-out threaded connections by rotating an adjacent tubular segment. In an embodiment in which a power tong assembly does not include an integral backup wrench, such as shown in FIG. 2A, reaction torque may be held on the lower tubular segment 202B using a drilling spider 204 and/or other tubular gripping mechanism (e.g., a manual tong, a spider, a collar load support), while the power tong assembly 200 is used to rotate and apply torque to the upper tubular segment 202A.

As shown in FIGS. 2A-2C, a tong operator 206 may be in close proximity to the power tong assembly 200, such as particularly when making-up and breaking-out connections. For example, a power tong 208 of the power tong assembly 200 is operable in a make-up direction and a break-out direction. In the make-up direction, the power tong 208 is used to rotate the upper tubular segment 202A in the first direction to make-up a threaded connection between the upper tubular segment 202A and the lower tubular segment 202B, and in the break-out direction, the power tong 208 is used to rotate the upper tubular segment 202A in the second direction to break-out the threaded connection between the upper tubular segment 202A and the lower tubular segment 202B. Furthermore, the power tong 208 may include a high gear setting and a low gear setting, with the power tong 208 switchable between the high gear and low gear settings. In the high gear setting, the power tong 208 is used to rotate the upper tubular segment 202A in the first direction or in the second direction at a high speed. In the low gear setting, the power tong 208 is used to rotate the upper tubular segment 202A in the first direction or in the second direction at a low speed. Accordingly, the tong operator 206 may operate and switch the power tong 206 between each of these different settings.

FIG. 2B shows an example of the power tong 208 when operated in the make-up direction, in which the power tong 208 is used in this embodiment to rotate the tubular segment 202A in a first direction (e.g., clockwise direction) when making-up threaded connections with the tubular segment 202A. As the power tong 208 rotates the tubular segment 202A in the clockwise direction, the power tong 208 will have the tendency to move and rotate from a reactive torque 210A in the counter-clockwise direction. In one or more embodiments, to prevent movement and rotation of the power tong 208, a snub line 212A may be attached to the power tong 208 in a direction opposite to the reactive torque 210A. As such, the snub line 212A may be used to prevent rotation of the power tong 208 when making-up threaded connections with the tubular segment 202A.

Similarly, FIG. 2C shows an example of the power tong 208 when operated in the break-out direction, in which the power tong 208 is used in this embodiment to rotate the tubular segment 202A in a second direction (e.g., counter-clockwise direction) when breaking-out threaded connections with the tubular segment 202A. As the power tong 208 rotates the tubular segment 202A in the counter-clockwise direction, the power tong 208 will have the tendency to move and rotate from a reactive torque 210B in the clockwise direction as well. In one or more embodiments, to prevent movement and rotation of the power tong 208, a snub line 212B may be attached to the power tong 208 in a direction opposite to the reactive torque 210A. As such, the snub line 212B may be used to prevent rotation of the power tong 208 when breaking-out threaded connections with the tubular segment 202A.

As shown in FIGS. 2B and 2C, the direction of the attachment of the snub line 212 to the power tong 208 depends on if the power tong 208 is operated in the make-up direction or the break-out direction. However, as the power tong 208 may not include an integral backup wrench, and is shown to only include the spider 204 to hold reaction torque, the power tong 208 may present a risk to the tong operator 206. In particular, in the embodiment shown in FIG. 2B, if the tong operator 206 switches the power tong 208 to operate in the break-out direction instead of the make-up direction, the snub line 212A will be ineffective in preventing rotation of the power tong 208. This will allow the power tong 208 to rotate and spin around the tubular segment 202A in the clockwise direction and strike the tong operator 206. This inefficiency is even further magnified if the tong operator 206 is operating the power tong 208 in the high-speed setting, as opposed to the low-speed setting. Similarly, in the embodiment shown in FIG. 2C, if the tong operator 206 switches the power tong 208 to operate in the make-up direction instead of the break-out direction, the snub line 212B will be ineffective in preventing rotation of the power tong 208. This will allow the power tong 208 to rotate and spin around the tubular segment 202A in the counter-clockwise direction and strike the tong operator 206.

Though not shown, the tong operator 206 often operates the power tong 208 from scaffolding or within confined spaces, in which the power tong 208 may then knock the tong operator 206 from the scaffolding and/or smash the tong operator 206 against the structure of a drilling rig, both of which are life-threatening injuries to the tong operator 206. Accordingly, the present disclosure relates to a power tong assembly, in which the power tong assembly includes a power tong and includes a speed limiting system operably coupled to the power tong. The speed limiting system is configured to selectively allow the power tong to rotate the tubular segment in one of the first direction and the second direction at unrestricted speeds, and is further configured to only allow the power tong to rotate the tubular segment in the other of the first direction and the second direction at a restricted speed when the power tong is in high gear (e.g., the high-speed setting) and/or in low gear (e.g., the low-speed setting).

As discussed above, the power tong 208 includes a make-up setting and a break-out setting, which may be operated through one or more handles or levers included with the power tong 208. The make-up setting enables the power tong 208 to rotate the tubular segment 202A in the first direction to make-up a threaded connection with the tubular segment 202B, and the break-out setting enables the power tong 208 to rotate the tubular segment 202A in the second direction to break-out the threaded connection with the tubular segment 202B.

Accordingly, a speed limiting system in accordance with the present disclosure that is operably coupled to the power tong 208 also includes a make-up setting and a break-out setting, in which the speed limiting system may be operated using a selector mechanism included within the speed limiting system. The make-up setting of the speed limiting system allows the power tong 208 to rotate the tubular segment 202A in the first direction to make-up the threaded connection with the tubular segment 202A at unrestricted speeds, and the break-out setting of the speed limiting system allows the power tong 208 to rotate the tubular segment 202A in the second direction to break-out the threaded connection with the tubular segment 202A at unrestricted speeds.

Figure 3A:
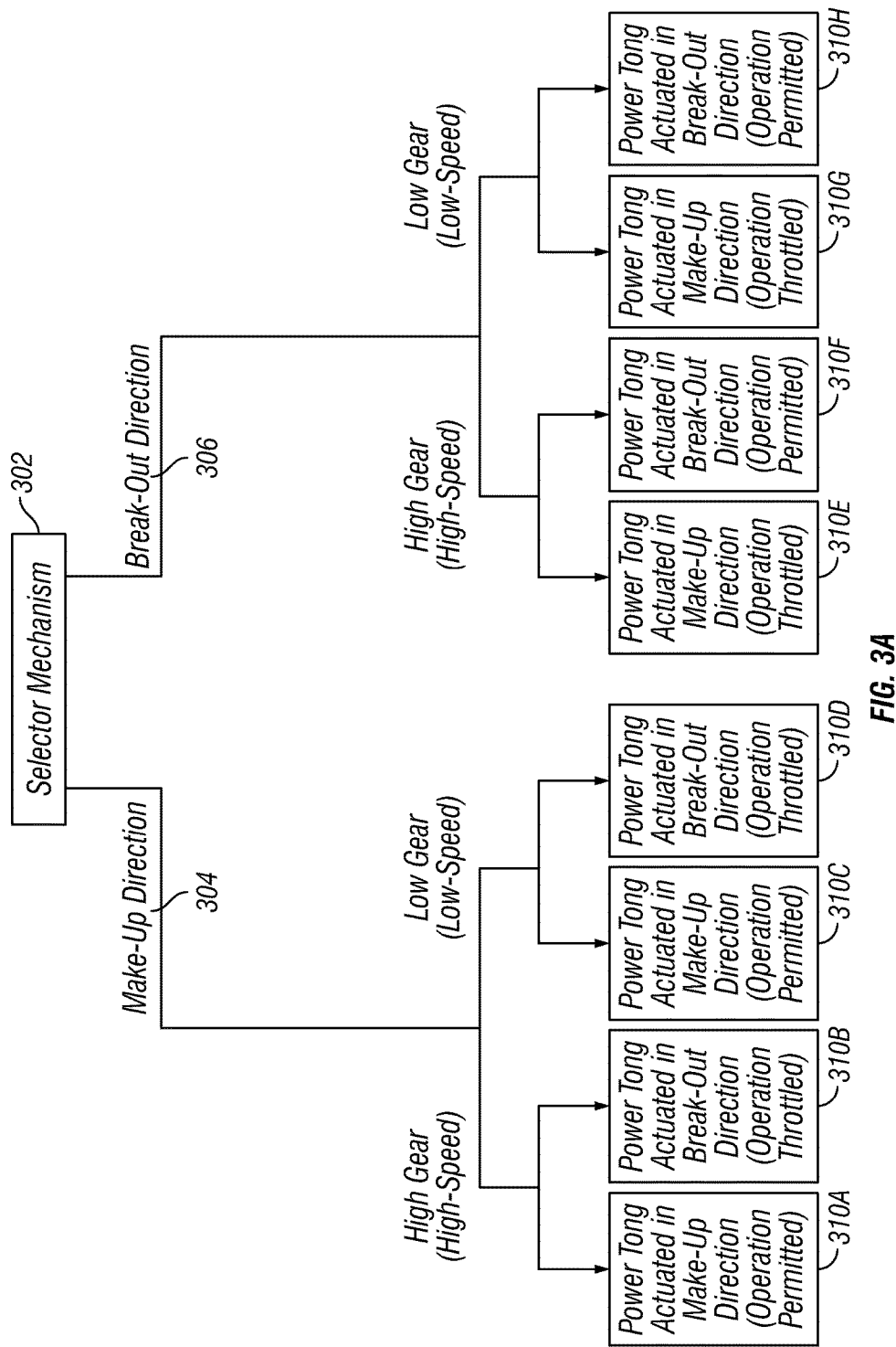
FIGS. 3A-3C show flow charts of operation of a power tong assembly in accordance with one or more embodiments of the present disclosure.

FIG. 3A shows a flow chart of operation of a power tong assembly in accordance with the present disclosure. In one or more embodiments, the speed limiting system may include a selector mechanism 302, in which the selector mechanism 302 may be used as a tong operator interface to switch and move the speed limiting system between operating the power tong in a make-up direction 304 or a break-out direction 306. If the selector mechanism 302 is in the make-up setting (e.g., a make-up position), the speed limiting system may permit the power tong to operate unrestricted in the make-up direction in high gear 310A and/or low gear 310C, and may limit or throttle the speed for the power tong to operate in the break-out direction in high gear 310B and/or in low gear 310B.

Further, If the selector mechanism 302 is in the break-out setting (e.g., a break-out position), the speed limiting system may limit or throttle the speed for the power tong to operate in the make-up direction in high gear 310E and/or in low gear 310G, and may permit the power tong to operate unrestricted in the break-out direction in high gear 310F and/or in low gear 310H.

Accordingly, a speed limiting system in accordance with the present disclosure may be configured to allow the power tong to operate in the make-up direction and in low gear and in high gear at unrestricted speeds when the speed limiting system is in the make-up setting. When the speed limiting system is in the make-up setting, the speed limiting system will throttle and limit the speed for the power tong to operate in the break-out direction in high gear and in low gear. For example, when in high gear, the power tong may be limited or throttled to operate at a speed the same or similar as that of the low gear, and when in low gear, the power tong may be limited or throttled to operate at a speed slower than that of the low gear when unrestricted (e.g., a slow creep).

Further, a speed limiting system in accordance with the present disclosure may be configured to allow the power tong to operate in the break-out direction and in low gear and in high gear at unrestricted speeds when the speed limiting system is in the break-out setting. When the speed limiting system is in the break-out setting, the speed limiting system will throttle and limit the speed for the power tong to operate in the make-up direction in high gear and in low gear. For example, when in high gear, the power tong may be limited or throttled to operate at a speed the same or similar as that of the low gear, and when in low gear, the power tong may be limited or throttled to operate at a speed slower than that of the low gear when unrestricted.

Figure 3B:
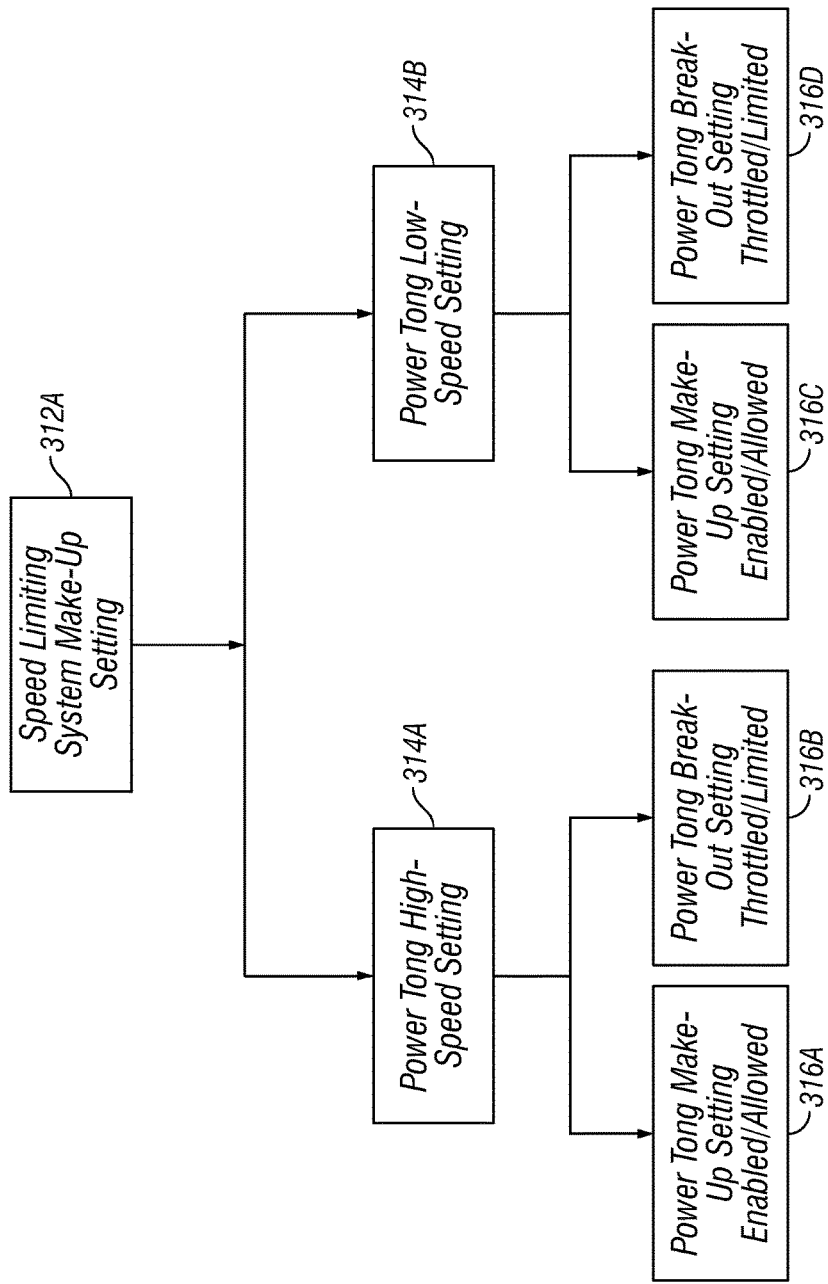

FIG. 3B shows a flow chart of operation of a power tong assembly with a speed limiting system in a make-up setting in accordance with the present disclosure. The speed limiting system may be set in a speed limiting system make-up setting 312A, and the power tong may be set in either a power tong high-speed setting 314A or a power tong low-speed setting 314B. When in the speed limiting system make-up setting 312A and the power tong high-speed setting 314A, the power tong is enabled/allowed to operate in a power tong make-up setting 316A and is throttled/limited to operate in a power tong break-out setting 316B (e.g., only allowing the power tong to operate at a rotational speed the same or similar to the power tong operating in the power tong-low speed setting 314B). When in the speed limiting system make-up setting 312A and the power tong low-speed setting 314B, the power tong is enabled/allowed to operate in a power tong make-up setting 316C and is throttled/limited to operate in a power tong break-out setting 316D.

Figure 3C:
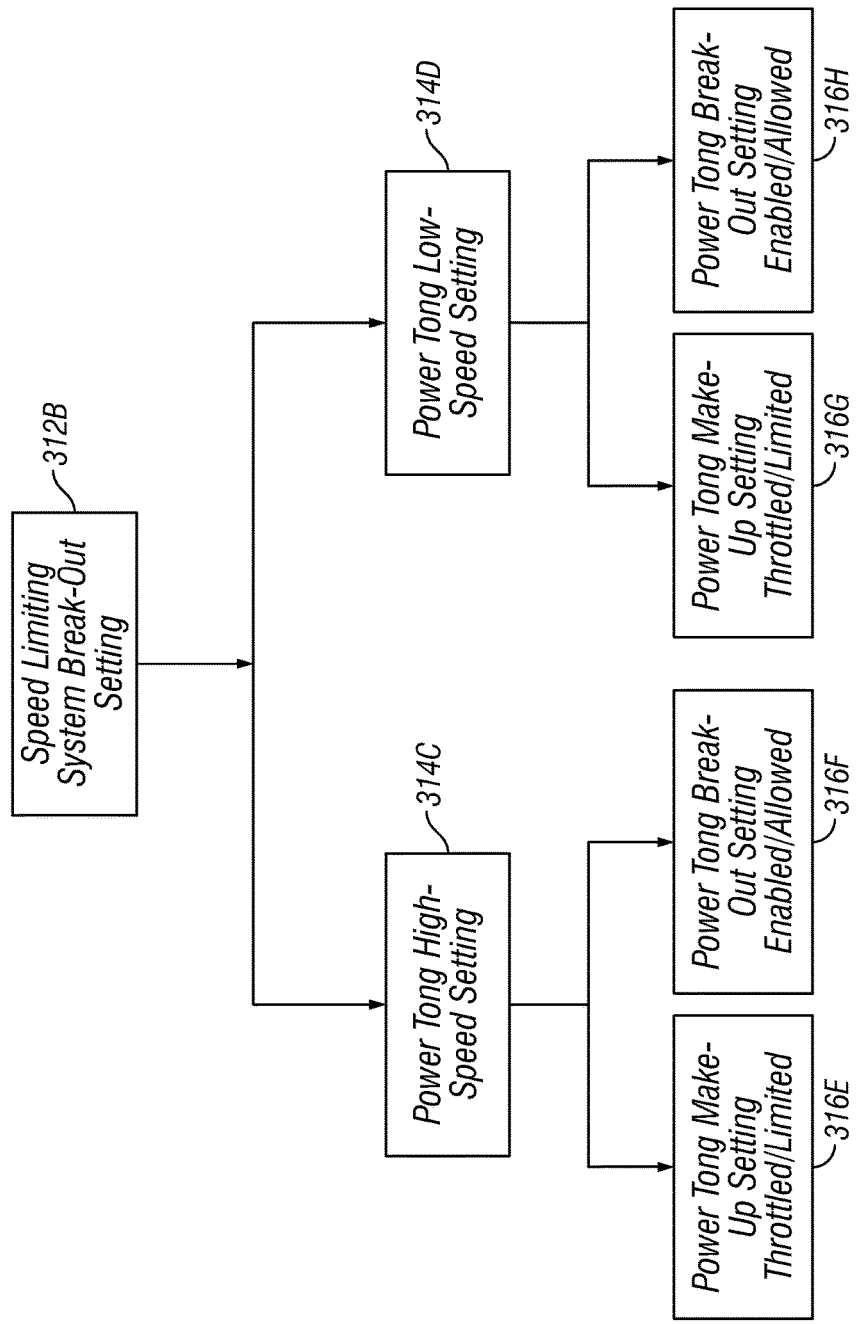

Further, FIG. 3C shows a flow chart of operation of a power tong assembly with a speed limiting system in a break-out setting in accordance with the present disclosure. The speed limiting system may be set in a speed limiting system break-out setting 312B, and the power tong may be set in either a power tong high-speed setting 314C or a power tong low-speed setting 314D. When in the speed limiting system break-out setting 312B and the power tong high-speed setting 314C, the power tong is throttled/limited to operate in a power tong make-up setting 316E (e.g., only allowing the power tong to operate at a rotational speed the same or similar to the power tong operating in the power tong-low speed setting 314D) and is enabled/allowed to operate in a power tong break-out setting 316F. When in the speed limiting system break-out setting 312B and the power tong low-speed setting 314D, the power tong is throttled/limited to operate in a power tong make-up setting 316G and is enabled/allowed to operate in a power tong break-out setting 316H.

A speed limiting system in accordance with the present disclosure may have one or more different types of configurations. For example, as shown and discussed below, the speed limiting system may be mechanically controlled, in which the speed limiting system may include one or more mechanical components that interact with each other to selectively allow the power tong to operate in a make-up setting or a break-out setting. In particular, the speed limiting system may be used to selectively provide and control a supply of hydraulic fluid to a hydraulic motor of the power tong, and even more particularly, the speed limiting system may be used to control a spool of a spool valve of the hydraulic motor for the power tong. However, in another embodiment, the speed limiting system may additionally or alternatively be magnetically controlled, electrically controlled, hydraulically controlled, and/or pneumatically controlled. Accordingly, the present disclosure contemplates other methods and configurations for a speed limiting system than only those discussed herein, and therefore the present disclosure should not be so limited.

A power tong assembly in accordance with one or more embodiments of the present disclosure may include a hydraulic motor, such as a bi-directional hydraulic motor, and a directional control valve that controls fluid flow to the hydraulic motor. In accordance with one or more embodiments, the directional control valve may include a four-way valve, such as a four-way, three-position directional control valve. An example of a directional control valve in accordance with the present disclosure may be a spool valve. The spool valve may be able to control the flow of hydraulic fluid therethrough that is provided to the hydraulic motor. As such, the directional control valve may be used to control the direction of rotation of the hydraulic motor, and therefore may be used to move and operate the power tong in the make-up setting and/or the break-out setting.

Figure 4A:
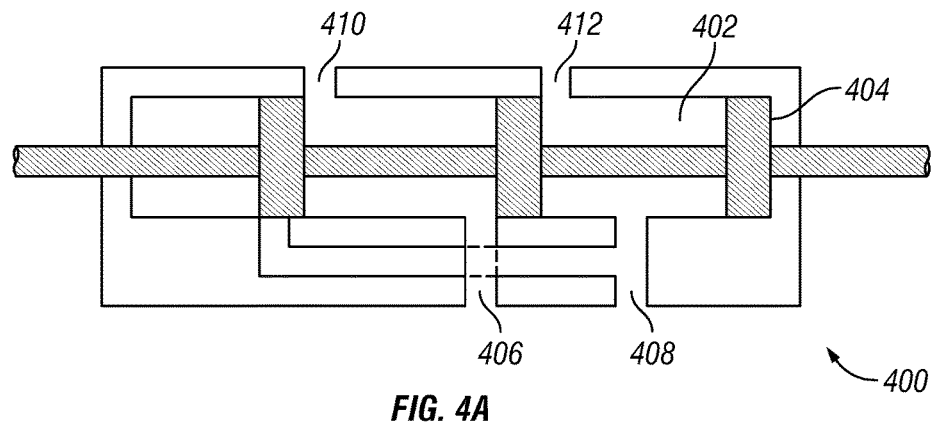
FIGS. 4A-4B show multiple views of a hydraulic spool valve in accordance with one or more embodiments of the present disclosure.
Figure 4B:
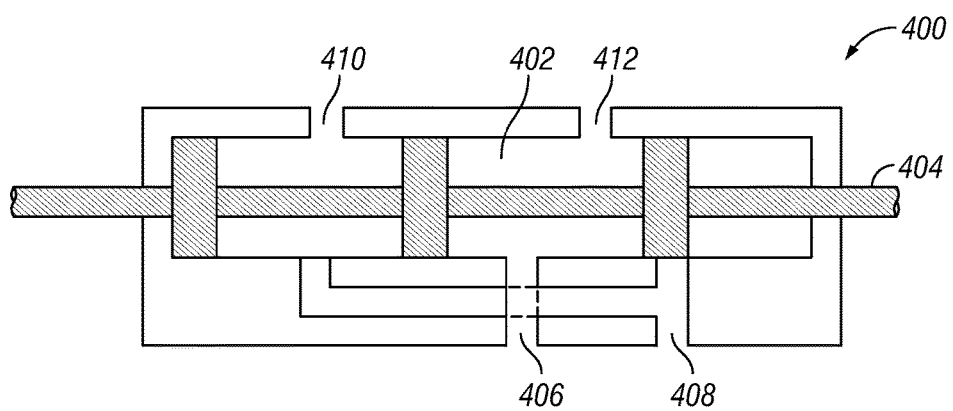

Referring now to FIGS. 4A and 4B, multiple cross-sectional views of a spool valve 400, such as used within a hydraulic motor of a power tong assembly, in accordance with one or more embodiments of a present disclosure is shown. FIG. 4A shows the spool valve 400 in a first position, such as when providing hydraulic fluid to the hydraulic motor for the power tong assembly to rotate a tubular segment in a first direction, and FIG. 4B shows the spool valve 400 in a second position, such as when providing hydraulic fluid to the hydraulic motor for the power tong assembly to rotate a tubular segment in a second direction.

The spool valve 400 may include one or more cavities 402 formed therein, with a spool 404 movably received within the cavity 402. The spool valve 400 may include one or more ports, such as a pressure flow path port 406 and a return flow path port 408. The pressure flow path port 406 may be used to receive hydraulic fluid into the spool valve 400, such as to receive hydraulic fluid from a pressure flow path that may be provided to the hydraulic motor of the power tong assembly. The return flow path port 408 may be used to return hydraulic fluid from the spool valve 400, such as to return hydraulic fluid to a return flow path that returns hydraulic fluid used within the hydraulic motor of the power tong assembly.

Further, the spool valve 400 may include an A-side port 410 and a B-side port 412. The A-side port 410 may be fluidly coupled to an A-side of the hydraulic motor of the power tong assembly, thereby providing or receiving hydraulic fluid through the A-side of the hydraulic motor. The B-side port 412 may be fluidly coupled to a B-side of the hydraulic motor of the power tong assembly, thereby providing or receiving hydraulic fluid through the B-side of the hydraulic motor. Depending on the desired rotation for the power tong assembly, hydraulic fluid may selectively flow into and be provided into either the A-side or the B-side of the hydraulic motor of the power tong assembly.

In the embodiment shown in FIG. 4A, the spool 404 may be in the (shown) first position within the spool valve 400 to provide hydraulic fluid to the A-side of the hydraulic motor. Hydraulic fluid may be received through the pressure flow path port 406 and then exit out the A-side port 410 of the spool valve 400 to provide hydraulic fluid to the A-side of the hydraulic motor, thereby enabling the hydraulic motor of the power tong assembly to operate and rotate a tubular segment in a first direction (or second direction is appropriately so configured). Hydraulic fluid may then return from the B-side of the hydraulic motor into the B-side port 412 and then exit out the return flow path port 408 of the spool valve 400.

In the embodiment shown in FIG. 4B, the spool 404 may be in the (shown) second position within the spool valve 400 to provide hydraulic fluid to the B-side of the hydraulic motor. Hydraulic fluid may be received through the pressure flow path port 406 and then exit out the B-side port 412 of the spool valve 400 to provide hydraulic fluid to the B-side of the hydraulic motor, thereby enabling the hydraulic motor of the power tong assembly to operate and rotate a tubular segment in a second direction (or first direction is appropriately so configured). Hydraulic fluid may then return from the A-side of the hydraulic motor into the A-side port 410 and then exit out the return flow path port 408 of the spool valve 400.

Figure 5A:
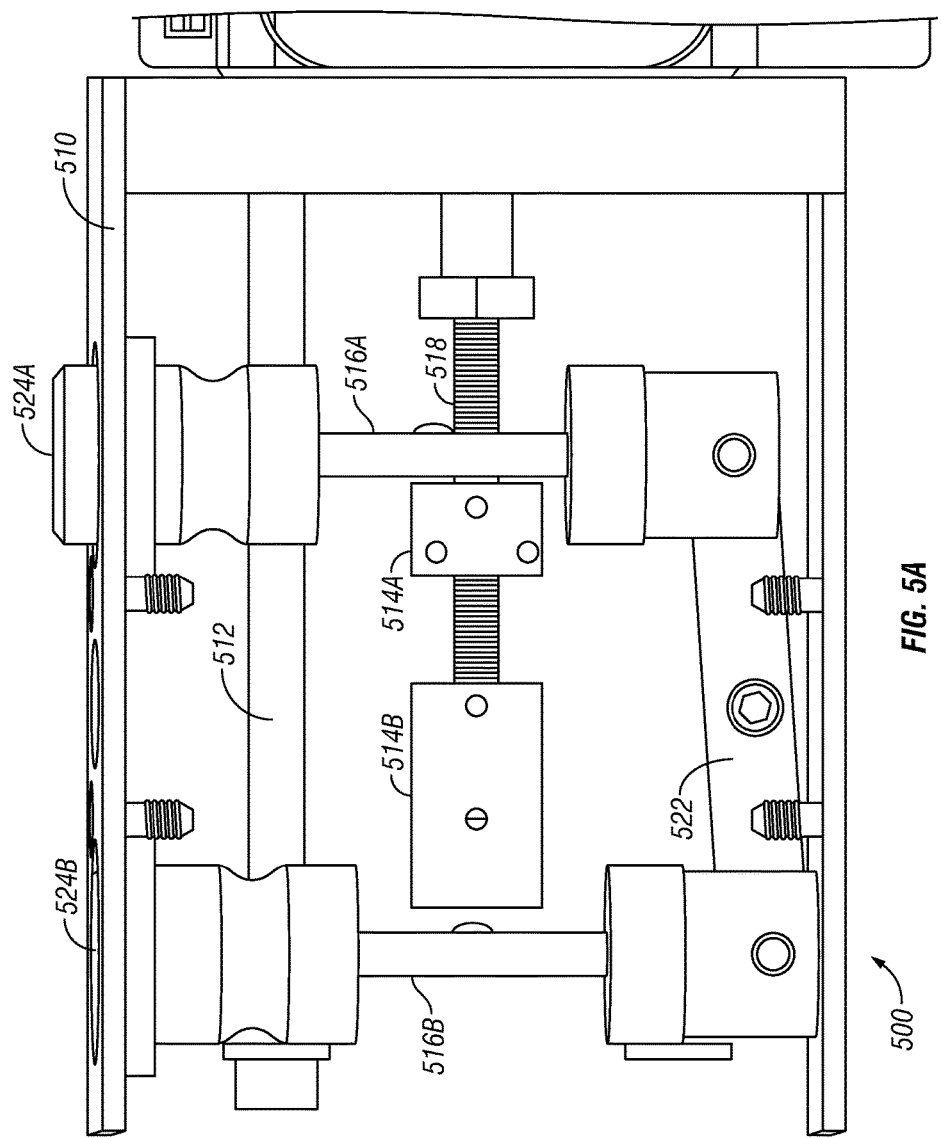
FIGS. 5A-5E show multiple views of a speed limiting system for a power tong assembly in accordance with one or more embodiments of the present disclosure.
Figure 5B:
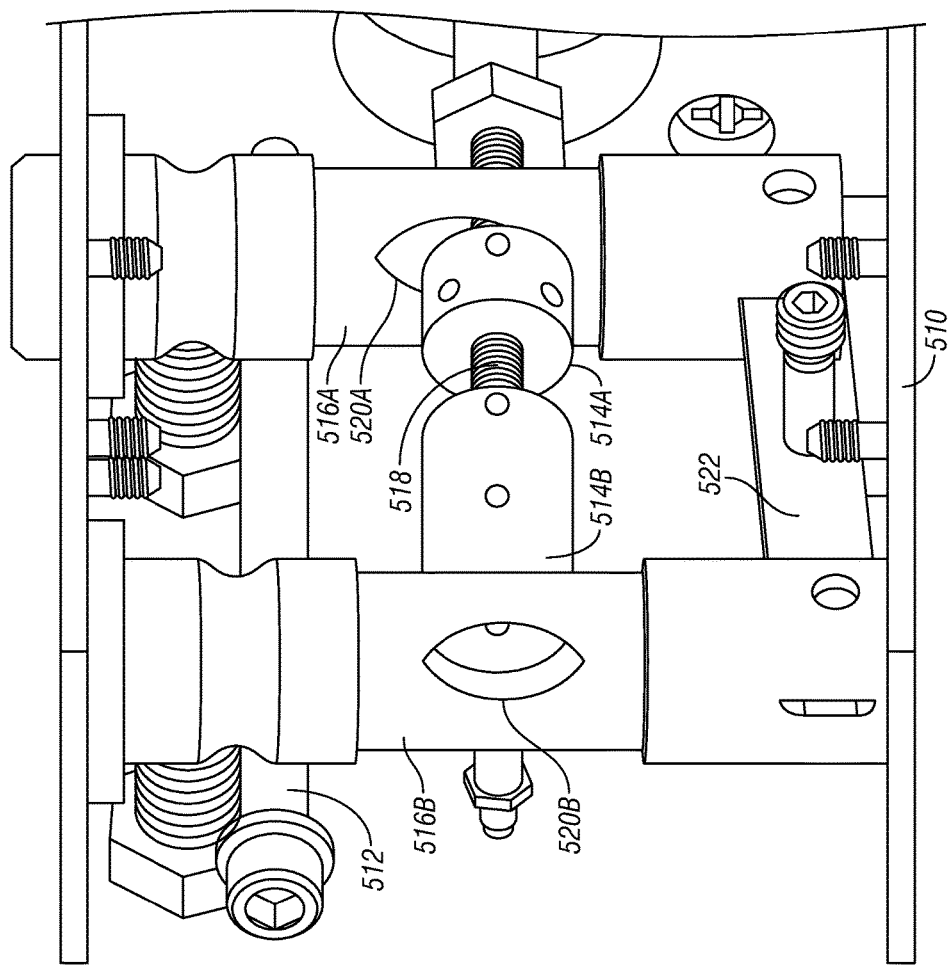
Figure 5C:
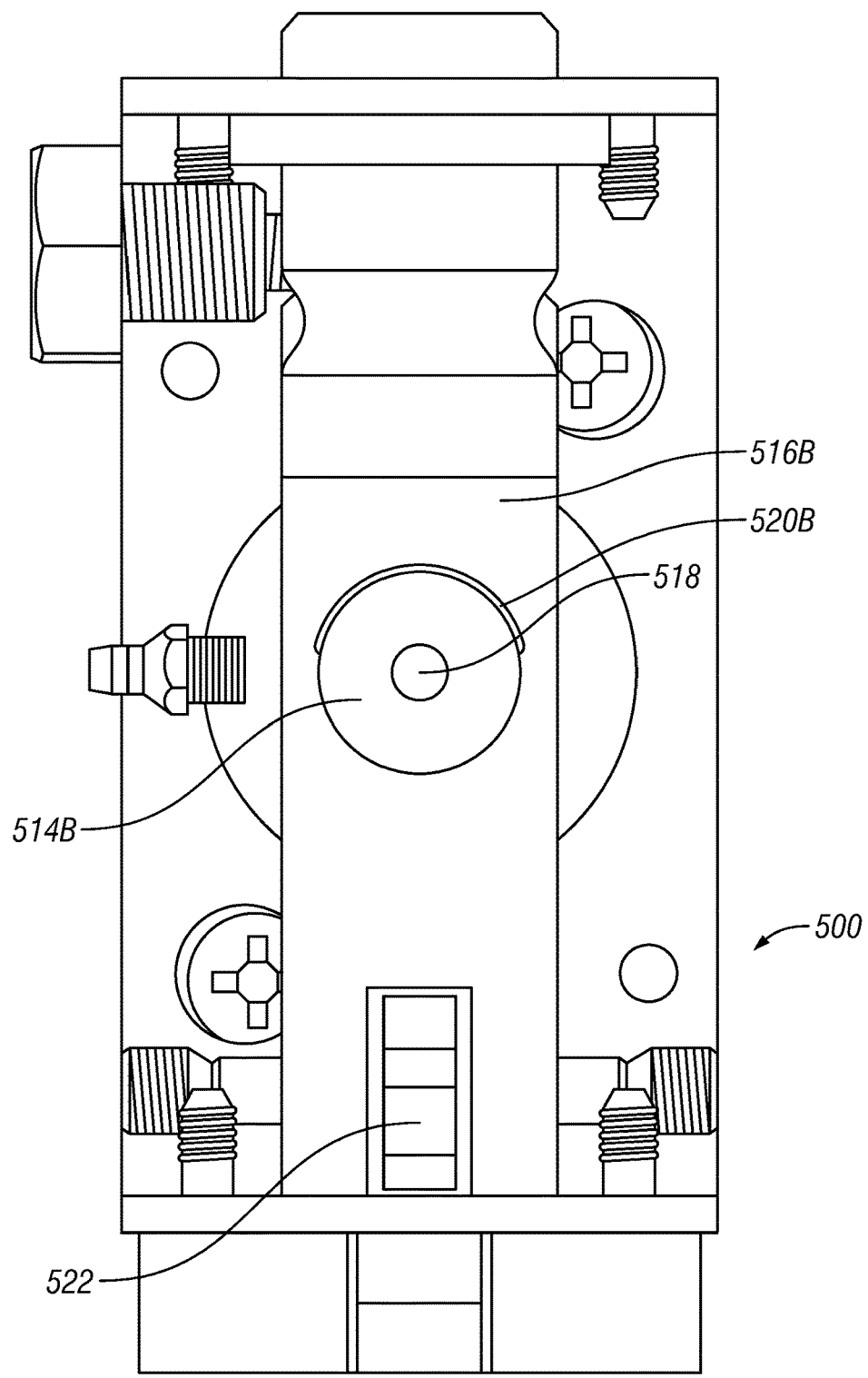
Figure 5D:
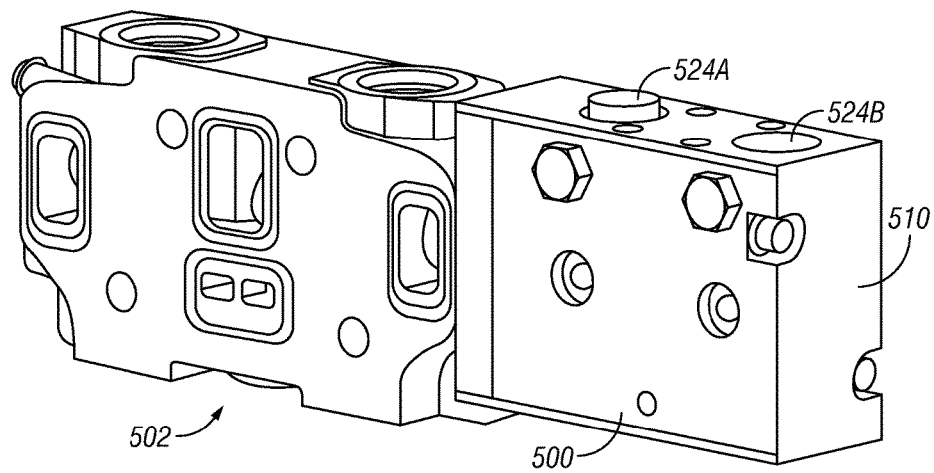
Figure 5E:
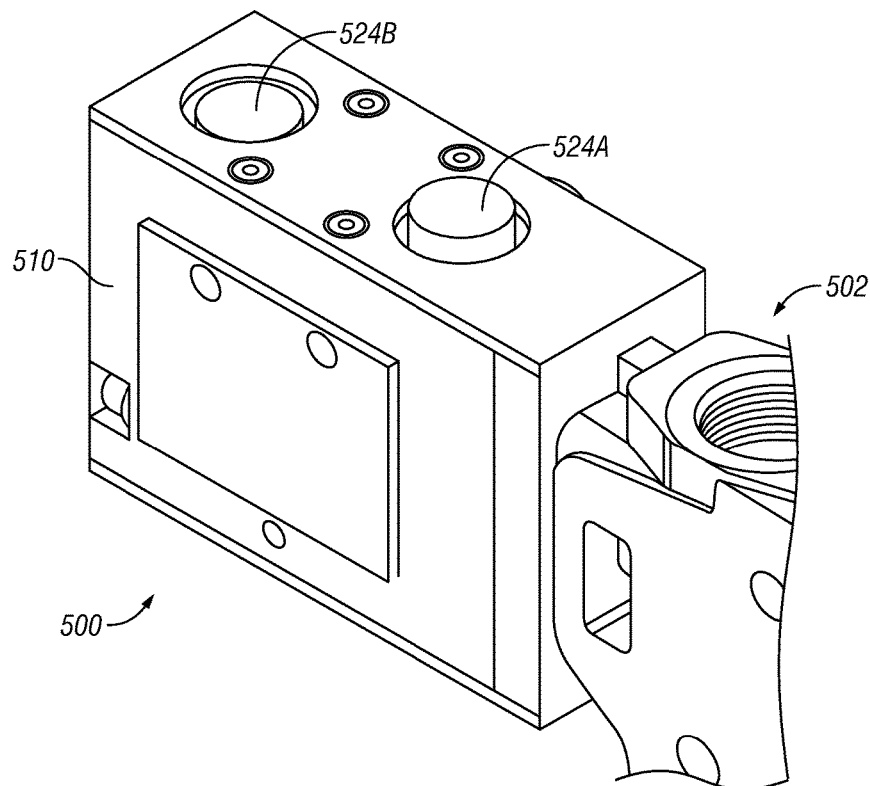

Referring now to FIGS. 5A-5E, multiple views of a speed limiting system 500 in accordance with one or more embodiments of the present disclosure are shown. FIG. 5A shows a front internal view of the speed limiting system 500, FIG. 5B a perspective internal view of the speed limiting system 500, FIG. 5C a side internal view of the speed limiting system 500, and FIGS. 5D and 5E show perspective views of the speed limiting system 500.

The speed limiting system 500 may be operably coupled to a spool valve 502 of a hydraulic motor of a power tong assembly in accordance with the present disclosure. In particular, the speed limiting system 500 may be coupled to a spool of the spool valve 502, such as the spool 404 of the spool valve 400 in FIGS. 4A and 4B. In such an embodiment, the speed limiting system 500 may be used to restrict movement of the spool of the spool valve 502 of the hydraulic motor for the power tong assembly. For example, the speed limiting system 500 may be used to restrict movement of the spool of the spool valve 502 in a first direction, such as to restrict movement of the spool 404 in the spool valve 400 to move into or from the first position shown in FIG. 4A, thereby restricting operation of the power tong assembly in a first direction at full rotational speed. Similarly, the speed limiting system 500 may be used to restrict movement of the spool of the spool valve 502 in a second direction, such as to restrict movement of the spool 404 in the spool valve 400 to move into or from the second position shown in FIG. 4B, thereby restricting operation of the power tong assembly in a second direction at full rotational speed.

In this embodiment, the speed limiting system 500 may include a housing 510, in which the housing 510 may be coupled to the spool valve 502, such as through the use of one or more connectors 512. For example, the connector 512, which may include a bolt, screw, and/or any other similar connection mechanism known in the art, may extend between the housing 510 and the spool valve 502 to connect the speed limiting system 500 to the spool valve 502. As such, in one or more embodiments, the housing 510 may be used to house, contain, and/or protect one or more components for the speed limiting system 500.

The speed limiting system 500 may include one or more abutment members 514 and one or more restrictor members 516. In this embodiment, the speed limiting system is shown including a first abutment member 514A and a second abutment member 514B, and is further shown including a first restrictor member 516A and a second restrictor member 516B. However, the present disclosure is not so limited, as more or less abutment members and/or restrictor members may be included within a speed limiting system without departing from the scope of the present disclosure.

The abutment members 514A and 514B may be coupled to the spool of the spool valve 502 of the hydraulic motor such that the abutment members 514A and 514B move along with and/or travel in unison with the spool of the spool valve 502. For example, as the spool of the spool valve 502 moves between a first position and a second position, such as when the hydraulic motor moves between the make-up setting and the break-out setting, the abutment members 514A and 514B may also move between a first position and a second position. In particular, the abutment members 514A and 514B may be connected (e.g., directly or indirectly) to a spool extension 518, in which the spool extension 518 may be connected (e.g., directly or indirectly) to the spool of the spool valve 502. As such, as the spool extension 518 moves along with and travels in unison with the spool valve 502, the abutment members 514A and 514B may move along with and travel in unison with the spool extension 518.

The relative position of the abutment members 514A and 514B may be adjusted along and with respect to the spool extension 518. For example, the abutment members 514A and 514B may be threadably coupled to the spool extension 518, thereby enabling the abutment members 514A and 514B to be moved along the spool extension 518 to a desired position. Similarly, the relative position of the spool extension 518 may be adjusted along and with respect to the spool of the spool valve 502. For example, the spool extension 518 may be threadably coupled to the spool of the spool valve 502, thereby enabling the spool extension to be moved into a desired position with respect to the spool of the spool valve 502.

The restrictor members 516A and 516B may be movable between an aligned position and an unaligned position with respect to the abutment members 514A and 514B. In particular, the first restrictor member 516A may be movable between an aligned position and an unaligned position with respect to the first abutment member 514A. When in the unaligned position, the first restrictor member 516A may restrict movement of the first abutment member 514A past a predetermined point with respect to the first restrictor member 516A. When in the aligned position, the first restrictor member 516A may allow movement of the first abutment member 514A past the predetermined point with respect to the first restrictor member 516A.

For example, as shown in FIGS. 5B and 5C, the restrictor members 516 may include a hole 520 formed therein. In particular, the first restrictor member 516A may include a first hole 520A formed therein. When in the unaligned position, the first hole 520A of the first restrictor member 516A may not align with the first abutment member 514A. As such, the first restrictor member 516A may restrict movement of the first abutment member 514A through the first hole 520A of the first restrictor member 516A when in the unaligned position. When in the aligned position, the first hole 520A of the first restrictor member 516A may align with the first abutment member 514A. As such, the first restrictor member 516A may allow movement of the first abutment member 514A through the first hole 520A of the first restrictor member 516A when in the aligned position.

Similarly, the second restrictor member 516B may be movable between an aligned position and an unaligned position with respect to the second abutment member 514B. When in the unaligned position, the second restrictor member 516B may restrict movement of the second abutment member 514B past a predetermined point with respect to the second restrictor member 516B. When in the aligned position, the second restrictor member 516B may allow movement of the second abutment member 514B past the predetermined point with respect to the second restrictor member 516B.

For example, as shown in FIGS. 5B and 5C, the second restrictor member 516B may include a second hole 520B formed therein. When in the unaligned position, the second hole 520B of the second restrictor member 516B may not align with the second abutment member 514B. As such, the second restrictor member 516B may restrict movement of the second abutment member 514B through the second hole 520B of the second restrictor member 516B when in the unaligned position. When in the aligned position, the second hole 520B of the second restrictor member 516B may align with the second abutment member 514B. As such, the second restrictor member 516B may allow movement of the second abutment member 514B through the second hole 520B of the second restrictor member 516B when in the aligned position.

Referring to FIGS. 5A-5C, the speed limiting system 500 may include a lever 522, such as positioned within the housing 510 of the speed limiting system 500. For example, in an embodiment in which the speed limiting system 500 includes the first restrictor member 516A and the second restrictor member 516B, the lever 522 may be coupled between the first restrictor member 516A and the second restrictor member 516B. As such, the lever 522 may be used to move the first restrictor member 516A with respect to the second restrictor member 516B. In particular, the lever 522 may be used to couple the first restrictor member 516A to the second restrictor member 516B such that, when the first restrictor member 516A is in the aligned position, the second restrictor member 516B is in the unaligned position. Similarly, when the first restrictor member 516A is in the unaligned position, the lever 522 may move the second restrictor member 516B to the aligned position.

Accordingly, in one or more embodiments, by limiting and restricting movement of the one or more abutment members, the one or more restrictor members may be able to limit and restrict the spool of the spool valve for the hydraulic motor of the power tong from being able to move between and to the first position and/or the second position, such as when the hydraulic motor moves between the make-up setting and the break-out setting. For example, with reference to FIG. 5A, in an embodiment in which the spool of the spool valve 502 travels to the left to enable the hydraulic motor of the power tong assembly to rotate a tubular segment in a first direction (e.g., make-up direction), the first restrictor member 516A may be moved into the unaligned position to prevent the first abutment member 514A from moving to the right and past the first restrictor member 516A, thereby preventing or restricting the power tong assembly from rotating the tubular segment in the second direction at full rotational speed. In such an embodiment, the make-up setting for the speed limiting system 500 that allows the power tong assembly to rotate the tubular segment in the first direction while preventing rotation in the second direction at full rotational speed may be when the first restrictor member 516A is in the unaligned position.

Similarly, in an embodiment in which the spool of the spool valve 502 travels to the right to enable the hydraulic motor of the power tong assembly to rotate a tubular segment in a second direction (e.g., break-out direction), the second restrictor member 516B may be moved into the unaligned position to prevent the second abutment member 514B from moving to the left and past the second restrictor member 516B, thereby preventing or restricting the power tong assembly from rotating the tubular segment in the first direction at full rotational speed. In such an embodiment, the break-out setting for the speed limiting system 500 that allows the power tong assembly to rotate the tubular segment in the second direction while preventing rotation in the first direction at full rotational speed may be when the second restrictor member 516B is in the unaligned position.

Accordingly, a speed limiting system in accordance with the present disclosure may include a selector mechanism that enables a tong operator interface to switch and move the speed limiting system 500 between the make-up setting and the break-out setting. In FIGS. 5A-5E, the selector mechanism may be operably coupled to the restrictor members 516 of the speed limiting system 500. More particularly, the restrictor members 516 may include a button, such as a first button 524A for the first restrictor member 516A and a second button 524B for the second restrictor member 516B accessible through the exterior of the housing 510. In this embodiment, the first button 524A may be pushed downward to move the first restrictor member 516A into the aligned position, in which this movement may also move the second restrictor member 516B into the unaligned position from the interaction with the lever 522. Similarly, the second button 524B may be pushed downward to move the second restrictor member 516B into the aligned position, in which this movement may also move the first restrictor member 516A into the unaligned position from the interaction with the lever 522.

Accordingly, a power tong assembly including a power tong and a speed limiting system in accordance with the present disclosure may include one or more advantages, such as by decreasing the likelihood of an accident when operating a power tong. In particular, the speed limiting system is configured to selectively allow the power tong to rotate the tubular segment in one of the first direction and the second direction at full rotational speed, whether high gear or low gear, while preventing the power tong to rotate the tubular segment at full rotational speed, whether high gear or low gear. As such, the speed limiting system may be used to prevent the power tong from operating at full rotational speed in a direction unintended by a tong operator, thereby preventing damage to the power tong, to the tubular segments handled by the power tong, and the tong operator.

Although the present invention has been described with respect to specific details, it is not intended that such details should be regarded as limitations on the scope of the invention, except to the extent that they are included in the accompanying claims.

What is claimed is:
1. A power tong assembly, comprising:
   a power tong comprising:
      a power tong make-up setting to grip and rotate a tubular segment in a first direction to make-up a threaded connection with the tubular segment;
      a power tong break-out setting to grip and rotate the tubular segment in a second direction to break-out the threaded connection with the tubular segment; and
      a power tong controller to switch the power tong between the power tong make-up setting and the power tong break-out setting; and
   a speed limiting system operably coupled to the power tong and comprising:
      a speed limiting system make-up setting to allow the power tong to operate in the power tong make-up setting and rotate the tubular segment in the first direction at a maximum speed and limit the power tong to rotate the tubular segment in the second direction below the maximum speed;
      a speed limiting system break-out setting to allow the power tong to operate in the power tong break-out setting and rotate the tubular segment in the second direction at the maximum speed and limit the power tong to rotate the tubular segment in the first direction below the maximum speed; and
a selector mechanism to switch the speed limiting system between the speed limiting system make-up setting and the speed limiting system break-out setting.

2. The power tong assembly of claim 1, wherein the power tong further comprises:
a power tong high-speed setting to rotate the tubular segment in the first direction and the second direction in a high gear; and
a power tong low-speed setting to rotate the tubular segment in the first direction and the second direction in a low gear.

3. The power tong assembly of claim 2, wherein:
the speed limiting system make-up setting allows the power tong to operate in the power tong high-speed setting and the power tong low-speed setting; and
the speed limiting system break-out setting allows the power tong to operate in the power tong high-speed setting and the power tong low-speed setting.

4. The power tong assembly of claim 1, wherein the speed limiting system is coupled to a spool of a spool valve that controls fluid flow to a hydraulic motor of the power tong assembly.

5. The power tong assembly of claim 4, wherein the speed limiting system is configured to selectively restrict movement of the spool of the spool valve in a first direction to limit fluid flow to the hydraulic motor while allowing full spool movement in a second direction, and wherein the speed limiting system is configured to selectively restrict movement of the spool of the spool valve in the second direction to limit fluid flow to the hydraulic motor while allowing full spool movement in the first direction.

6. The power tong assembly of claim 5, wherein the speed limiting system comprises:
an abutment member coupled to the spool of the spool valve such that the abutment member moves along with the spool of the spool valve; and
a restrictor member movable between an aligned position and an unaligned position with respect to the abutment member;
wherein, in the unaligned position, the restrictor member restricts movement of the abutment member past a predetermined position with respect to the restrictor member; and
wherein, in the aligned position, the restrictor member allows movement of the abutment member past the predetermined position with respect to the restrictor member.

7. The power tong assembly of claim 6, wherein the abutment member is connected to a spool extension, wherein the spool extension is connected to the spool of the spool valve, and wherein a position of the abutment member is adjustable with respect to the spool extension.

8. The power tong assembly of claim 6, wherein the speed limiting system further comprises:
a second abutment member coupled to the spool of the spool valve of the hydraulic motor such that the second abutment member moves along with the spool of the spool valve; and
a second restrictor member movable between an aligned position and an unaligned position with respect to the second abutment member;
wherein, in the unaligned position, the second restrictor member restricts movement of the second abutment member past a second predetermined position with respect to the second restrictor member;
wherein, in the aligned position, the second restrictor member allows movement of the second abutment member past the second predetermined position with respect to the second restrictor member; and
a lever coupled between the first restrictor member and the second restrictor member such that, when the first restrictor member is in one of the aligned position and the unaligned position, the second restrictor member is in the other of the aligned position and the unaligned position.

9. The power tong assembly of claim 8, wherein, when the first restrictor member is in the unaligned position, the speed limiting system is in the speed limiting system make-up setting, and when the second restrictor member is in the unaligned position, the speed limiting system is in the speed limiting system break-out setting.

10. The power tong assembly of claim 6, wherein, in the unaligned position, the restrictor member restricts movement of the abutment member through a hole of the restrictor member, and wherein, in the aligned position, the restrictor member allows movement of the abutment member through the hole of the restrictor member.

11. A method to operate a power tong assembly, comprising:
gripping a tubular segment with a power tong of the power tong assembly;
operating the power tong in a power tong make-up setting or a power tong break-out setting using a power tong controller such that, in the power tong make-up setting, the power tong rotates the tubular segment in a first direction to make-up a threaded connection with the tubular segment, and in the power tong break-out setting, the power tong rotates the tubular segment in a second direction to break-out the threaded connection with the tubular segment; and
switching a speed limiting system coupled to a power tong between a speed limiting system make-up setting and a speed limiting system break-out setting using a selector mechanism such that, in the speed limiting system make-up setting, the speed limiting system allows the power tong to operate in the power tong make-up setting to rotate the tubular segment in the first direction at a maximum speed and limit the power tong to rotate the tubular segment in the second direction below the maximum speed, and in the speed limiting system break-out setting, the speed limiting system allows the power tong to operate in the power tong break-out setting to rotate the tubular segment in the second direction at the maximum speed and limit the power tong to rotate the tubular segment in the first direction below the maximum speed.

12. The method of claim 11, further comprising at least one of:
limiting rotational speed of the tubular segment below the maximum speed in the second direction with the power tong while in the speed limiting system make-up setting; and
limiting rotational speed of the tubular segment below the maximum speed in the first direction with the power tong while in the speed limiting system break-out setting.

13. The method of claim 12, wherein limiting rotational speed of the tubular segment below the maximum speed comprises:

restricting movement of a spool of a spool valve for a hydraulic motor of the power tong with the speed limiting system.

14. The method of claim 13, wherein the speed limiting system further comprises:
an abutment member coupled to the spool of the spool valve of the hydraulic motor such that the abutment member moves along with the spool of the spool valve; and
a restrictor member movable between an aligned position and an unaligned position with respect to the abutment member;
wherein, in the unaligned position, the restrictor member restricts movement of the abutment member in the first direction past a predetermined position with respect to the restrictor member; and
wherein, in the aligned position, the restrictor member allows movement of the abutment member in the first direction past the predetermined position with respect to the restrictor member.

15. A power tong assembly, comprising:
a power tong comprising:
a power tong make-up setting to rotate a tubular segment in a first direction to make-up a threaded connection with a second tubular segment;
a power tong break-out setting to rotate the tubular segment in a second direction to break-out the threaded connection with the second tubular segment; and
a power tong controller to switch the power tong between the power tong make-up setting and the power tong break-out setting; and
a speed limiting system operably coupled to the power tong, the speed limiting system comprising:
a speed limiting system make-up setting to allow the power tong to rotate the tubular segment at the maximum speed in the first direction to make-up the threaded connection with the second tubular segment and prevent the power tong to operate at the maximum speed in the second direction;
the speed limiting system break-out setting to allow the power tong to rotate the tubular segment at the maximum speed in the second direction to break-out the threaded connection with the second tubular segment and prevent the power tong to operate at the maximum speed in the first direction; and
a selector mechanism to switch the speed limiting system between the speed limiting system make-up setting and the speed limiting system break-out setting.

16. The power tong assembly of claim 15, wherein the speed limiting system is configured to restrict movement of a spool of a spool valve for a hydraulic motor of the power tong in a first direction when in the speed limiting system break-out setting to prevent the power tong to rotate the tubular segment at the maximum speed in the first direction, and wherein the speed limiting system is configured to restrict movement of the spool of the spool valve for the hydraulic motor of the power tong in a second direction when in the speed limiting system make-up setting to prevent the power tong to rotate the tubular segment at the maximum speed in the second direction.

17. The power tong assembly of claim 16, wherein the speed limiting system comprises:
an abutment member coupled to the spool of the spool valve of the hydraulic motor such that the abutment member moves along with the spool of the spool valve; and
a restrictor member movable between an aligned position and an unaligned position with respect to the abutment member;
wherein, in the unaligned position, the restrictor member restricts movement of the abutment member past a predetermined position with respect to the restrictor member; and
wherein, in the aligned position, the restrictor member allows movement of the abutment member past the predetermined position with respect to the restrictor member.

* * * * *